United States Patent
Wu et al.

(10) Patent No.: US 7,162,646 B2
(45) Date of Patent: Jan. 9, 2007

(54) DISK ANTI-COPY SYSTEM, METHOD AND ITS DEVICE

(75) Inventors: Guo-Zua Wu, Taichung (TW); I-Yen Lin, Taipei (TW); Wen-Hsing Hsu, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 855 days.

(21) Appl. No.: 10/315,135

(22) Filed: Dec. 10, 2002

(65) Prior Publication Data

US 2004/0049689 A1   Mar. 11, 2004

(51) Int. Cl.
- *G06F 11/30* (2006.01)
- *G06F 12/14* (2006.01)
- *G04L 9/30* (2006.01)

(52) U.S. Cl. .............. 713/193; 380/201; 380/277; 380/281; 713/189; 713/171

(58) Field of Classification Search ............... 713/193
See application file for complete search history.

(56) References Cited

U.S. PATENT DOCUMENTS

| | | | |
|---|---|---|---|
| 6,883,097 B1* | 4/2005 | Lotspiech et al. | 713/193 |
| 6,993,135 B1* | 1/2006 | Ishibashi | 380/277 |
| 2001/0021255 A1* | 9/2001 | Ishibashi | 380/277 |
| 2003/0198351 A1* | 10/2003 | Foster et al. | 380/281 |

* cited by examiner

*Primary Examiner*—Gilberto Barron
*Assistant Examiner*—Samson Lemma
(74) *Attorney, Agent, or Firm*—Birch, Stewart, Kolasch, and Birch, LLP (57) ABSTRACT

A disk anti-copy system. An encrypted anti-copy mechanism with a device key table (Kd Table) prepared in a device and a fixed encryption processed media key block (MKB) pre-recorded in a disk is established. Only through the appropriate fixed encryption process between the key and the MKB can the device correctly read the disk. This controls the device and prevents disks from being copied. Moreover, the invention provides a method and device for preventing disks from being copied.

17 Claims, 7 Drawing Sheets

FIG. 1

FIG. 2 pre-recording location
in the lean-in area of the disk

| Media Key | Special Value |
|---|---|
| K0 | S0 |
| K1 | S1 |
| ⋮ | ⋮ |
| Kd | Svalue |
| Additional Device Key (Kaddition) | Additional Special Value (Saddition) |

FIG. 5a

| | |
|---|---|
| 0 | Media Key Block Type1 |
| 1 | Device Key Type |
| 2–3 | Block Length |
| 4–7 | Reserve Block |
| 8–10 | Random Number Series 0 |
| ⋮ | ⋮ |
| ⋮ | Random Number Series(Dt1) |

FIG. 5b

| 0 | Media Key Block Type2 |
|---|---|
| 1 | Device Key Type |
| 2 | Block Length |
| 3 | |
| 4 | Reserve Block |
| 5 | |
| 6 | |
| 7 | |
| 8 | Encrypted Series0 |
| 9 | |
| 10 | |
| ⋮ | ⋮ |
| ⋮ | Encrypted Series (Dt2) |
| ⋮ | |

FIG. 5c

DISK ANTI-COPY SYSTEM, METHOD AND ITS DEVICE

BACKGROUND OF THE INVENTION

1. Field of Invention

The invention relates to a key management system and, in particular, to a disk anti-copy system used between a digital device and a digital recording medium that uses a device key table (Kd Table) prepared in the device and a media key block (MKB) pre-recorded in the disk to perform fixed encryption and decryption processes.

2. Related Art

With the tremendous progress in computer hardware and software technologies and the wide multimedia applications, the technology of digital data storage has received a lot of attention. However, since the digital data can be readily dupliciated, the digital data protection stored on the recording medium is not as easy as traditional publications. The related intelligence property (IP) problems become serious. To protect the privacy and security of digital data, many anti-copy systems have been proposed.

According to the employed techniques, the normal anti-copy system can be divided into two parts: cipher algorithm and key management. Most of the prior art focuses on the improvement in the cipher algorithm. Very few people devote themselves to the new development in key management. However, anti-copy systems that involve only improvements in the cipher algorithms are very vulnerable. Therefore, it is imperative to establish a robust and complete key management mechanism, through which digital data storage security and privacy can be truly guaranteed.

Figure 3:
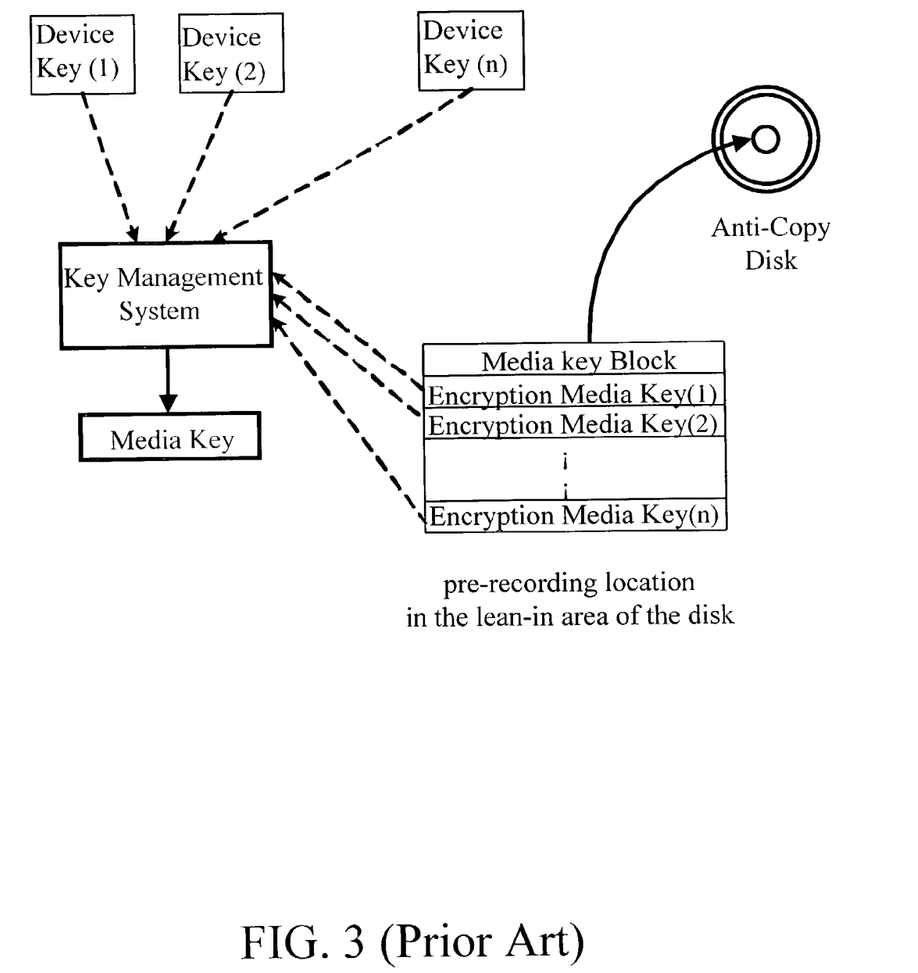
FIG. 3 shows the disk anti-copy technique in the prior art.

The CPPM (Content Protection for Pre-recorded Media) and CPRM (Content Protection for Recorded Media) are two anti-copy system standards used in read-only recording media and rewriteable recording media. Both methods utilize the new generation technology in the cipher algorithm and key management. The main operation mode is to embed a device key table (Kd Table) into the device during manufacturing and then along with a media key block (MKB) pre-recorded in a recording medium, thus hoping to prevent the disks from being copied. The general idea is shown in FIG. 3. Nevertheless, both methods have the key-meet-in-the-middle problem. Eventually, it can be broken by hackers.

Therefore, it is of great importance for the digital data storage technology to provide an ideal key management system that makes necessary improvements in existing Kd Table and MKB. The objectives are to lower the decipher probability as well as to increase the confidentiality and security of the recorded data contents.

SUMMARY OF THE INVENTION

In view of the foregoing, the invention provides a disk anti-copy system, method and the corresponding device. The invention achieves the goals of lowering the decipher probability and increasing the disk privacy and security using improved device key table (Kd Table) and a media key block (MKB) in the disk (recording medium).

Another objective of the invention is to increase the robustness of the disk anti-copy mechanism and the flexibility in use. The maintenance and management of the Kd Table in the device and the MKB in the recording medium are achieved through a centralized management of a key management system.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

The specification discloses a disk anti-copy system, method and the corresponding device. By disk, we generally refer to the so-called "recording medium." The basic types of the recording media include "read-only" and "re-writeable." The device 50 mentioned above includes in general the software and hardware that can read/write on a disk (recording medium) 100. Examples are audio/video (AV) players and CD-ROM players.

Figure 1:
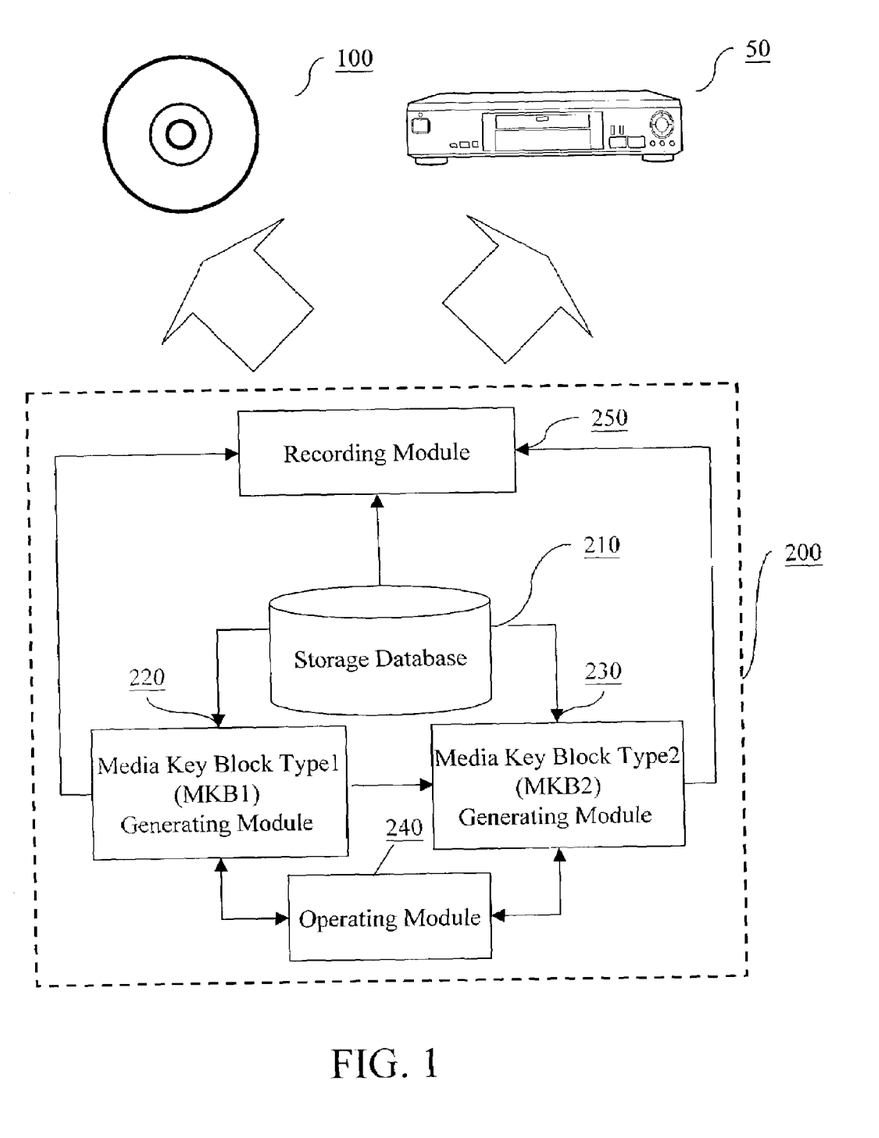
FIG. 1 shows the structure of the disclosed anti-copy system.

First, we use FIG. 1 to explain the disclosed disk anti-copy system. The system basically covers a cipher algorithm and a key management system. However, the cipher algorithm part is not the essence of the invention and can be understood from the related prior art. Therefore, we will emphasize on the key management system 200. The main function of the key management system 200 is the encryption anti-copy process by preparing a device key table (Kd Table) in the device 50 and pre-recording a media key block (MKB) in the disk 100.

Figure 4:
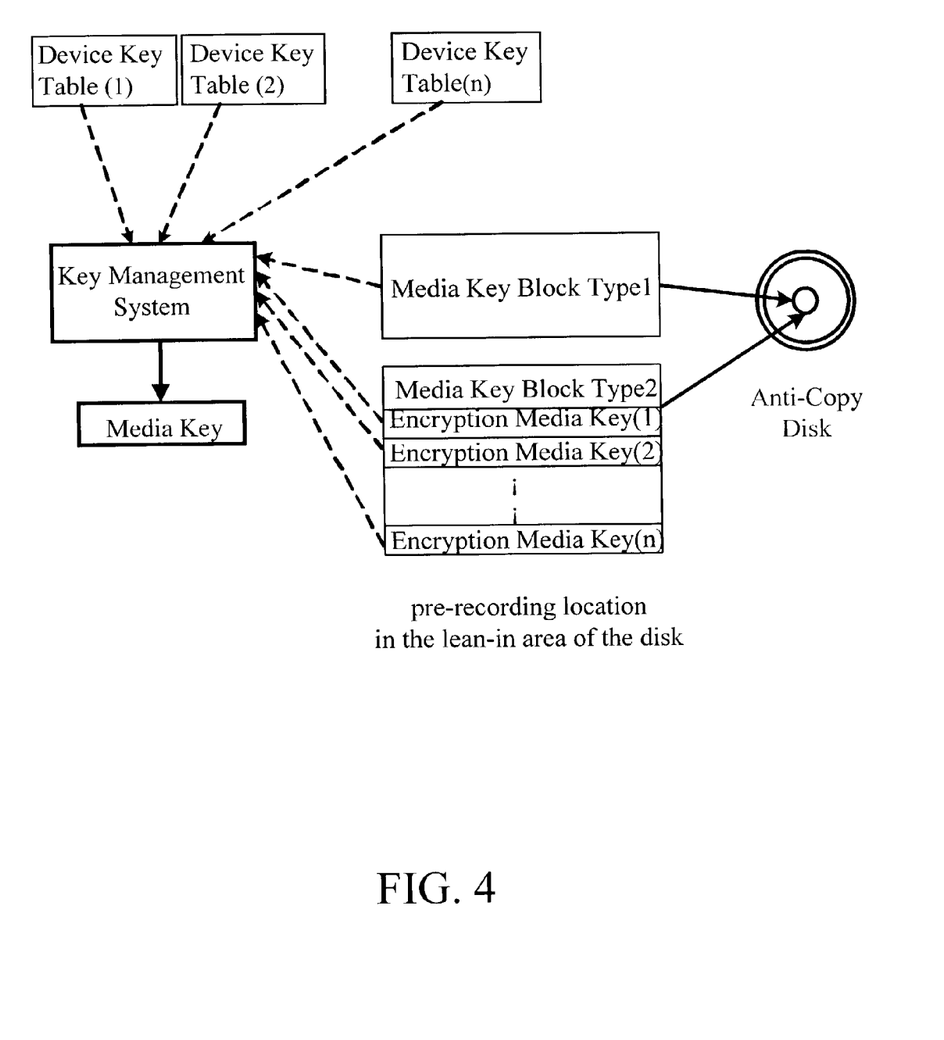
FIG. 4 shows the disk anti-copy concept of the invention.

The concept of the key management system 200 is schematically shown in FIG. 4. It contains the following modules.

Figure 5A:
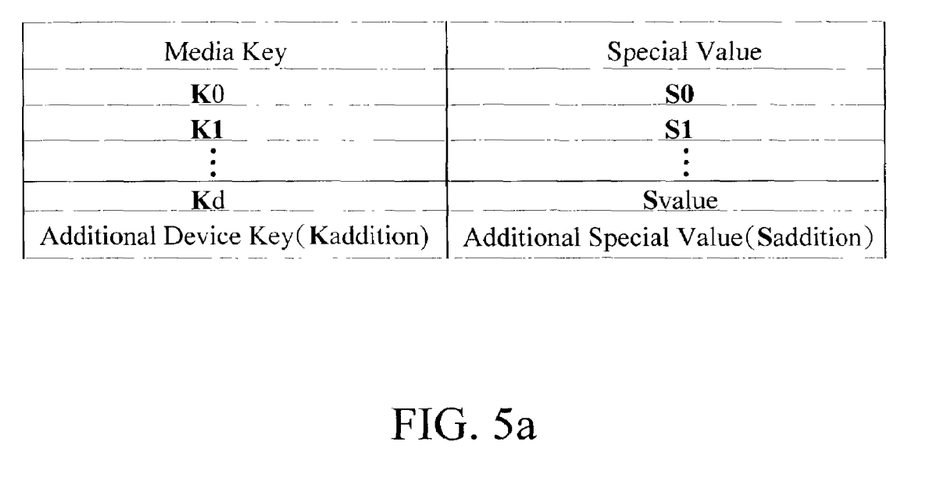
FIG. 5a is a schematic view of the data structure in the Kd Table.

(1) Storage database 210. It stores several Kd Tables (see FIG. 5a), each of which corresponds to a device 50.

Figure 5B:
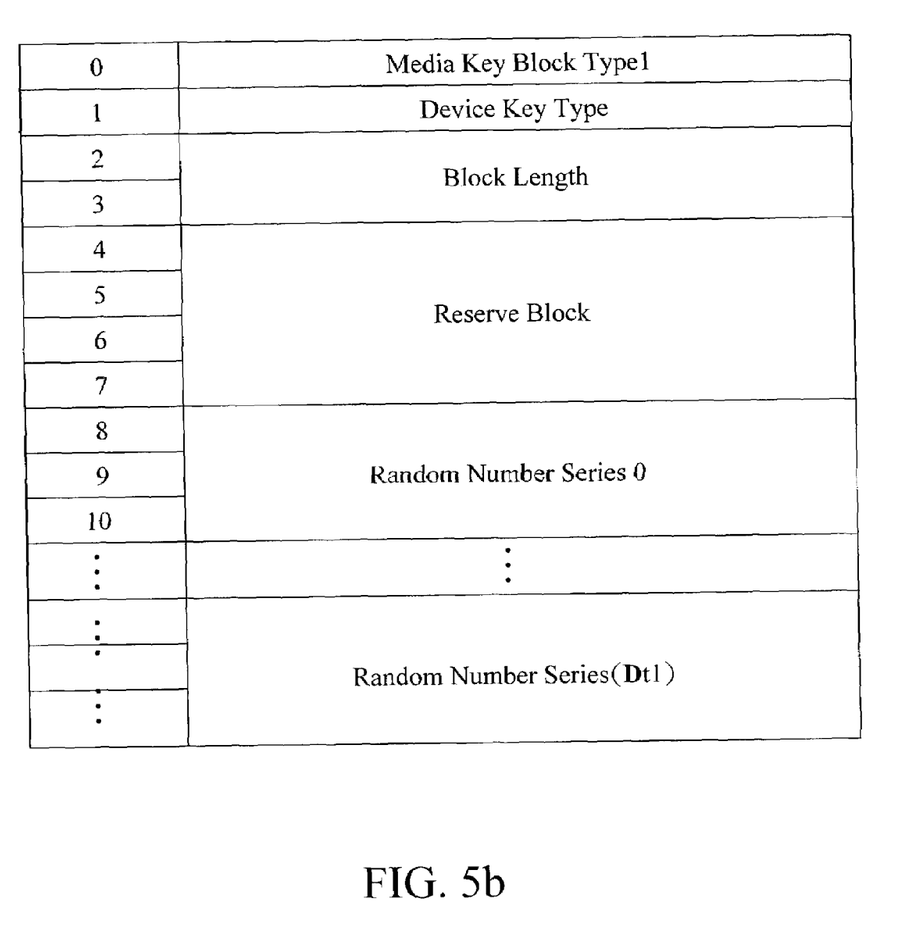
FIG. 5b is a schematic view of the media key block type 1 (MKB 1)

(2) MKB Type 1 (MKB 1) Generating Module 220. It determines an upper limit, Smax, of the MKB1 according to the number of device keys (Kd's) in the Kd Table and fills in the field of the MKB1 a random number series, Dt1, produced by an operation module 240, generating the MKB1 (see FIG. 5b).

Figure 5C:
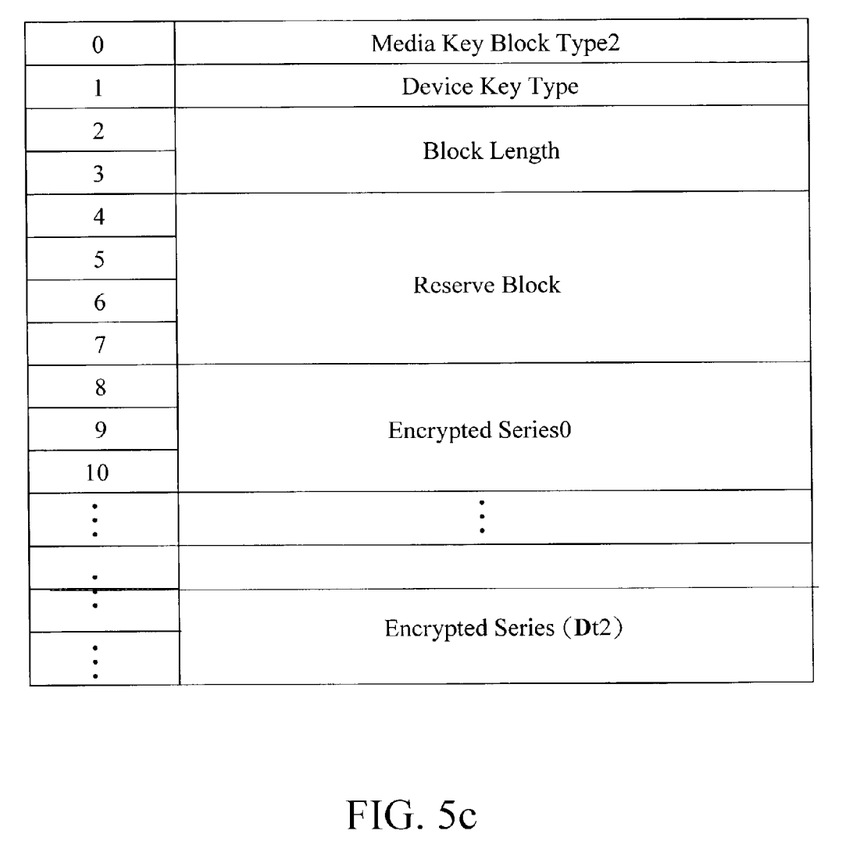
FIG. 5c is a schematic view of the media key block type 2 (MKB2).

(3) MKB Type 2 (MKB2) Generating Module 230. It performs decipher operations for each random number series corresponding to each special value, Svalue, for all the Kd's in the Kd Table. The result undergoes a logic operation (the XOR operation) with the number 0, generating a temporary key series, Ktemp. The temporary key series undergoes the same logic operation with a media key, Kmedia, as before, producing a new temporary key series result. An additional device key, Kaddition, performs an encryption operation on Ktemp to produce an encrypted series, Dt2. The encrypted series is then stored in the field of additioanl special value, Saddition, in the MKB2. The module 230 completes the process of filling the data into the MKB2 for a single device 50. Such a process is repeated for each of the devices 50 and, finally, the MKB2 is produced (see FIG. 5c).

(4) Operating Module 240. It is used to generate a random number series. It further performs logic operations, encryption algorithm operations, and decryption algorithm operations. The cipher algorithm used by the module 240 may be conventional. However, it is preferred to use the new-generation Rijndeal cipher standards.

(5) Recording Module 250. It pre-records the Kd Table of each device to the corresponding device 50. It also pre-records the MKB Type 1 and the MKB Type 2 to the disk 100. In particular, the pre-recording location is in the lean-in area of the disk.

In the following paragraph, we use FIG. 2 to explain the decryption anti-copy process on the device 50 and the disk 100 according to the invention.

First, the device 50 reads from the disk 100 the MKB1, the MKB2, and the Kd Table corresponding to the device 50 (step 300). The device 50 further reads several device keys (Kd's) from the Kd Table, several special values, Svalue, corresponding to the Kd's, and several random number serieses, Dt1, corresponding to the special values from the MKB1 (step 310). Afterwards, the decryption results of the random number serieses using the device keys are computed and undergo a logic operation (the XOR operation), producing a temporary key series, Ktemp (step 320). The additional device keys, Kaddition, and the corresponding additional special values, Saddition, in the Kd Table are read out. The additional special values are then used to extract the corresponding encryption number series, Dt2, in the MKB2 (step 330). Operations are then performed to obtain encryption results of the encryption serieses using the additional device keys. The encryption results undergo a logic operation with the temporary key series, generating the final media key (Kmedia). The media key is then used to read the contents in the disk 100.

In fact, the operation of the invention can be further explained through mathematical equations. Suppose there are m devices 50, each of which has a device key table with n keys. For the ith device 50, the anti-copy process performed on the device 50 and the disk 100 by the disclosed key management system 200 is as follows:

(1) Set Ktemp=0;

(2) Ktemp=Ktemp⊕D(Ki,Dt1_Si), for i=0,1 . . . ,n−1;

(3) Set Ktemp=Ktemp⊕Kmedia and obtain Dt2=E(Kaddition,Ktemp); and (4) Fill Dt2 into the Saddition'th position.

This completes the anti-copy encryption process for the ith device 50. Repeating the above steps (1) through (4) m times can complete the process for the whole MKB2.

Figure 2:
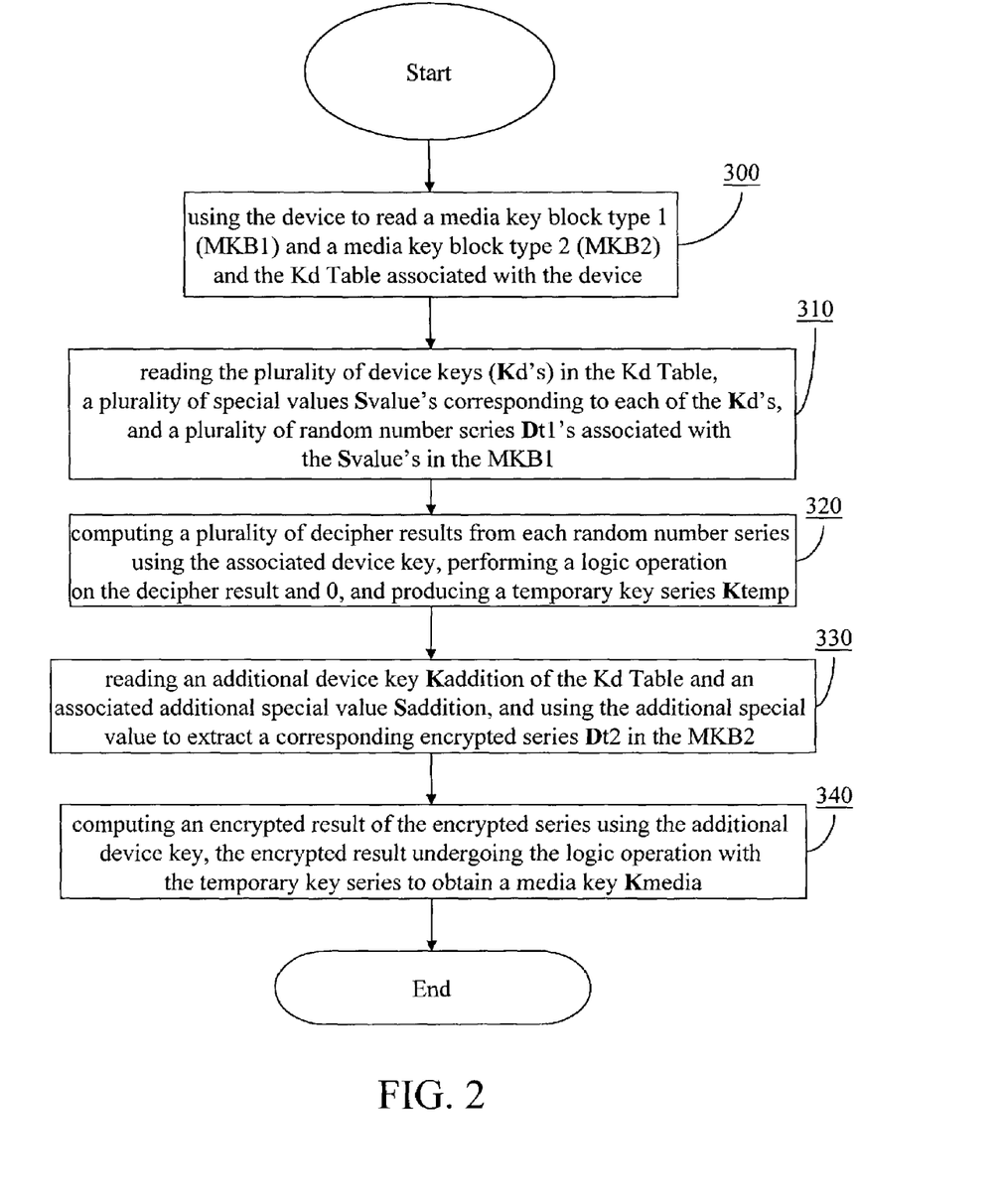
FIG. 2 is a flowchart of the disclosed anti-copy method.

In a similar fashion, when the ith device 50 reads the disk 100 and performs the decryption process as shown in FIG. 2, the details can be expressed as follows:

(1) Set Ktemp=0;

(2) Ktemp=Ktemp⊕D(Ki,Dt1_Si), for i=0,1 . . . n−1;

(3) Read the Saddition'th position in MKB2, i.e. Dt2_Saddition; and (4) Obtain Kmedia=Ktemp⊕E(Kaddition, Dt2_Saddition).

Using the obtained Kmedia, the ith device 50 can read out the data stored in the disk.

EFFECTS OF THE INVENTION

The disclosed disk anti-copy system, method and the corresponding device use improved device key table (Kd Table) and media key block (MKB) to perform the concept of level keys to make the encryption procedure more sophisticated. Due to the limited known conditions and many variables, the decipher probability can be greatly reduced, ensuring the privacy and security of the data stored in the disk.

Moreover, the disclosed key management system can provide maintenance and management for the Kd Table of each device and the MKB of each recording medium. This makes the disk anti-copy mechanism more robust and flexible.

What is claimed is:

1. A disk anti-copy system, which prepares a device key table (Kd Table) in a device and pre-records a plurality of media key blocks (MKB's) in a disk for effective control of the device and disk anti-copy, the system comprising:

a storage database, which stores one Kd Table for each of the devices;

an operating module, which generates a random number series, performs a logic operation, a cipher algorithm, and a decipher algorithm;

a media key block type 1 (MKB1) generating module, which determines an upper limit (Smax) of the MKB1 according to the number of the plurality of device keys (Kd's) in the Kd Table and fills in the MKB1 the random number series generated by the operating module, producing the MKB1;

a media key block type 2 (MKB2) generating module, which, for each of the device key in the Kd Table, performs the decipher algorithm operation on the random number series Dt1, corresponding to the special value Svalue, associated with the device key, takes a decipher result to perform the logic operation with 0 to produce a temporary key series Ktemp, uses Ktemp and a media key Kmedia to perform the logic operation to produce a new Ktemp, uses an additional device key Kaddition to perform the cipher operation on Ktemp and produce an encrypted series Dt2, stores Dt2 in the field of an additional special value Saddition in the MKB2, thereby completing the single device data storage in the MKB2 and this process being repeated for all the devices to generate the MKB2; and a recording module, which prepares each of the Kd Tables in the corresponding device and pre-records the MKB1 and the MKB2 on the disk.

2. The disk anti-copy system of claim 1, wherein the lean-in area of the disk stores the MKB1 and the MKB2.

3. The disk anti-copy system of claim 1, wherein the Kd Table contains the fields of the device key Kd and special value Svalue, each of the fields having (Kd+1) data contents where the final data content recording the additional device key Kaddition and the additional special value Saddition.

4. The disk anti-copy system of claim 1, wherein the cipher algorithm and the decipher algorithm follow the new-generation Rijndael cipher standards.

5. The disk anti-copy system of claim 1, wherein the upper limit satisfies the condition: $0 \leq Svalue \leq Smax$.

6. The disk anti-copy system of claim 1, wherein the logic operation is an XOR operation.

7. A disk anti-copy method, which prepares a device key table (Kd Table) in a device through a decipher algorithm and deciphers a plurality of media key blocks (MKB's) through a cipher algorithm pre-recorded in a disk so that the device can read data out from the disk, the method comprising the steps of:

using the device to read a media key block type 1 (MKB1) and a media key block type 2 (MKB2) and the Kd Table associated with the device;

reading the plurality of device keys (Kd's) in the Kd Table, a plurality of special values Svalue's corresponding to each of the Kd's, and a plurality of random number series Dt1's associated with the Svalue's in the MKB1;

computing a plurality of decipher results from each random number series using the associated device key, performing a logic operation on each of the decipher results and 0, and producing a temporary key series Ktemp;

reading an additional device key Kaddition of the Kd Table and an associated additional special value Saddition, and using the additional special value to extract a corresponding encrypted series Dt2 in the MKB2;

computing an encrypted result of the encrypted series using the additional device key, the encrypted result undergoing the logic operation with the temporary key series to obtain a media key Kmedia; and reading out the data recorded in the disk.

8. The disk anti-copy method of claim 7, wherein the MKB1 the and the MKB2 are stored in a lean-in area of the disk.

9. The disk anti-copy method of claim 7, wherein the cipher algorithm and the decipher algorithm covers any cipher algorithm technique and follow the new-generation Rijndael cipher standards.

10. The disk anti-copy method of claim 7, wherein the Kd Table contains the fields of the device key Kd and special value Svalue, each of the fields having (Kd+1) data contents where the final data content recording the additional device key Kaddition and the additional special value Saddition.

11. The disk anti-copy method of claim 7, wherein the logic operation is an XOR operation.

12. A disk anti-copy device, which stores a device key table (Kd Table) recorded in a device produced by a preparation procedure, the device having to use a plurality of media key blocks (MKB's) produced using a cipher algorithm and stored in a disk in order to read the disk through a decipher algorithm, the disk anti-copy device comprising the steps of:

using the device to read a media key block type 1 (MKB1) and a media key block type 2 (MKB2) and the Kd Table associated with the device;

reading the plurality of device keys (Kd's) in the Kd Table, a plurality of special values Svalue's, corresponding to each of the kd's, and a plurality of random number series Dt1's associated with the Svalue's in the MKB1;

computing a plurality of decipher results from each random number series using the associated device key, performing a logic operation on each of the decipher results and 0, and producing a temporary key series Ktemp;

reading an additional device key Kaddition of the Kd Table and an associated additional special value Saddition, and using the additional special value to extract a corresponding encrypted series Dt2 in the MKB2;

computing an encrypted result of the encrypted series using the additional device key, the encrypted result undergoing the logic operation with the temporary key series to obtain a media key Kmedia; and reading out the data recorded in the disk.

13. The disk anti-copy device of claim 12, wherein the device refers in general software and hardware that is able to access data contents in the disk.

14. The disk anti-copy device of claim 12, wherein the MKB1 and the MKB2 are stored in a lean-in area of the disk.

15. The disk anti-copy device of claim 12, wherein the cipher algorithm and the decipher algorithm follow the new-generation Rijndael cipher standards.

16. The disk anti-copy device of claim 12, wherein the Kd Table contains the fields of the device key Kd and special value Svalue, each of the fields having (Kd+1) data contents where the final data content recording the additional device key Kaddition and the additional special value Saddition.

17. The disk anti-copy device of claim 12, wherein the logic operation is an XOR operation.

* * * * *